(12) United States Patent
Morgante

(10) Patent No.: US 7,030,528 B2
(45) Date of Patent: Apr. 18, 2006

(54) DUAL CONCENTRIC AC MOTOR

(75) Inventor: John C. Morgante, Noblesville, IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/361,100

(22) Filed: Feb. 6, 2003

(65) Prior Publication Data

US 2004/0155554 A1 Aug. 12, 2004

(51) Int. Cl.
*H02K 17/44* (2006.01)

(52) U.S. Cl. ...................... 310/112; 310/114
(58) Field of Classification Search ............. 310/112, 310/114, 216, 217, 254
See application file for complete search history.

(56) References Cited

U.S. PATENT DOCUMENTS 3,308,318 A * 3/1967 Dunaiski et al. ............ 310/114
3,973,137 A * 8/1976 Drobina ...................... 310/114
5,783,893 A * 7/1998 Dade et al. .................. 310/266
6,373,160 B1 * 4/2002 Schrodl ....................... 310/114
6,590,312 B1 * 7/2003 Seguchi et al. ............. 310/266

* cited by examiner

Primary Examiner—Darren Schuberg
Assistant Examiner—Nguyen Hanh
(74) Attorney, Agent, or Firm—Christopher DeVries

(57) ABSTRACT

A dual concentric AC motor allows for two independently operating AC motors that produce the same torque at the same current input as two conventional, separate electric motors while occupying a smaller physical volume. The dual concentric AC motor utilizes a single, hollow cylindrical stator core comprising inner and outer stators and an inner rotor and an outer rotor that operate independently of one another. The inner stator, with windings that face toward the center of the motor, couples to the inner rotor, which rotates inside the single stator core, while the outer stator, with windings that face away from the center of the motor, couples to the outer rotor, which rotates around the single stator core. A back iron, centrally located in the single stator core, physically and magnetically separates the inner and outer stators. The two rotors are coupled to separate, independent output shafts.

6 Claims, 2 Drawing Sheets

DUAL CONCENTRIC AC MOTOR

TECHNICAL FIELD

This invention relates generally to an electric motor, and more specifically to a dual concentric alternating current electric motor.

BACKGROUND OF THE INVENTION

In many applications, such as in hybrid motor vehicles, there is a need for two high torque electric motors. Depending on the particular application, the two motors may not need to produce the same torque, but both can be characterized as high torque. The torque produced by an alternating current electric motor is directly proportional to, among other factors, the current flowing through the motor windings and the square of the diameter of the motor, usually defined as the diameter of the airspace between the rotor and stator of the motor. Hence, two ways to increase the torque of a motor are either to increase the diameter of the motor or to run the motor at a higher current. Again, depending on the application, it may not be possible to arbitrarily increase either or both the current through the motor windings and the motor diameter. Instead, the current through the motor windings may be limited by the capability of cooling the motor, and the diameter of the motor may be limited by the space available in the motor vehicle or other application.

In prior applications the need for two high torque electric motors has been met by two separate motors. The two motors may be mounted side by side along a common axis, or the two motors may be mounted on different axes. In order to develop the required amount of torque from each of the two motors, they have been built with large diameters and/or have been designed for large winding currents. In many applications, however, these approaches to providing the necessary torque are limited by the physical constraints of the application. Expanding the diameter of the motors may not be possible given certain space restrictions. The space allocated for the electric motors may be limited, for example, in a motor vehicle or the like. Increasing the winding current for a motor is not as efficient for increasing torque as is increasing the motor diameter because winding current has only a first power effect on torque in contrast to the second power effect of motor diameter. In addition, increasing the winding current leads to increases in Ohmic heating within the motor since Ohmic heating is proportional to the square of the current. The increase in heating, in turn, requires more cooling which increases cost and often weight and/or space.

Current two-motor designs can only deliver high torque at the cost of either increased volume and/or increased winding current with the attendant increases in cooling systems necessary to maintain an acceptable motor temperature. Accordingly, a need exists for an improved dual electric motor that is capable of providing the torque required for an application without unduly increasing motor volume or motor winding current.

BRIEF DESCRIPTION OF THE DRAWINGS

The invention will be understood after review of the following description considered together with the drawings in which.

DESCRIPTION OF THE PREFERRED EMBODIMENT

Two electric motors required for many applications take up too much space and/or require too high a winding current to achieve the torque necessary for the application. The two separate electric motors can be replaced, however, by a dual concentric alternating current (AC) electric motor, in accordance with an embodiment of the invention, that utilizes a single stator core with dual windings and independently operating inner and outer rotors. The dual concentric AC electric motor, in accordance with the invention, is capable of producing the same torque, at the same motor winding current, and within a smaller volume than the two separate electric motors. Dual concentric AC electric motors, in accordance with the invention, find application, for example, in hybrid motor vehicles. It is not intended, however, to limit the scope or application of the invention to any particular application.

Figure 1:
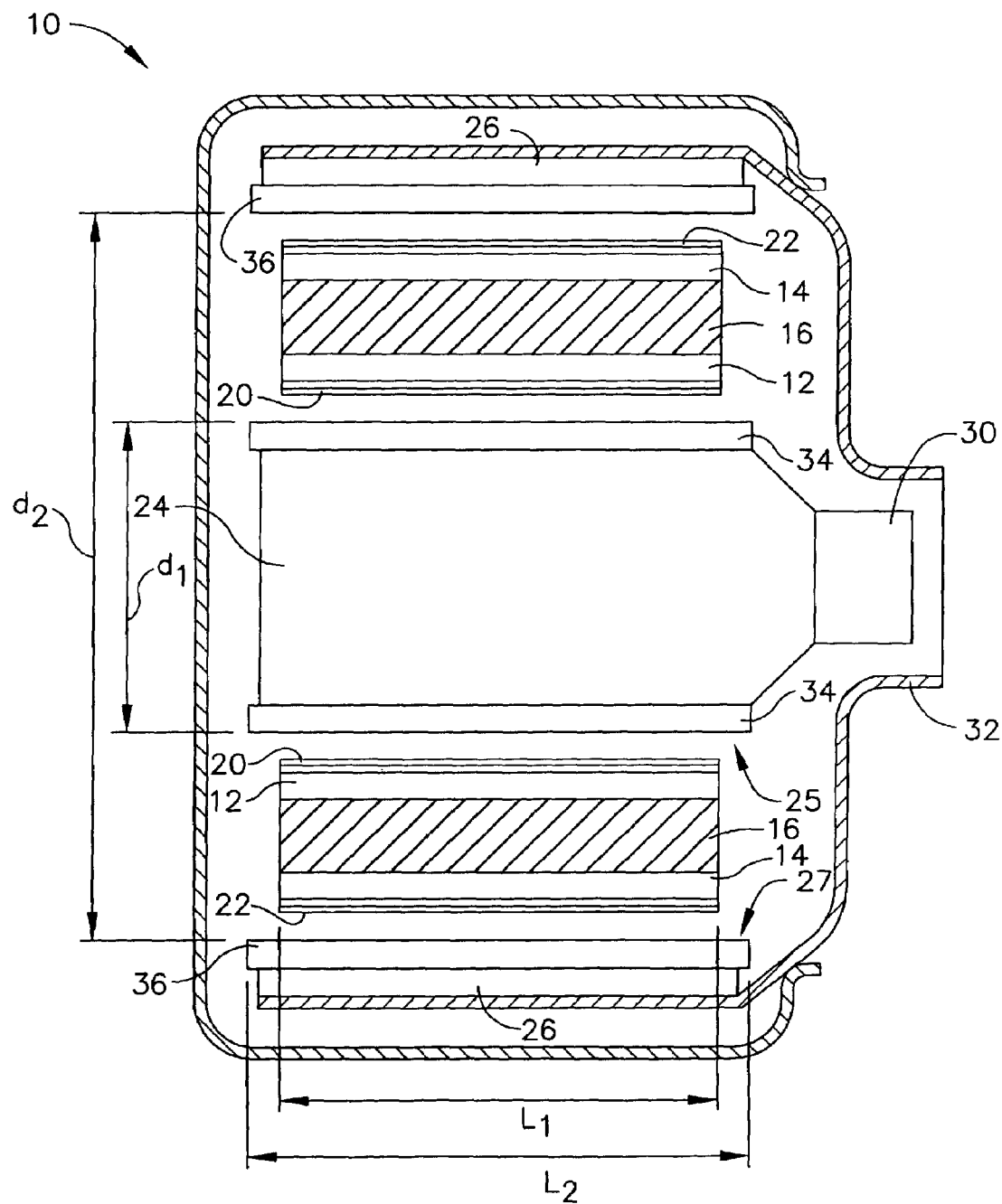
FIG. 1 illustrates, in cross section, a dual concentric AC electric motor in accordance with an embodiment of the invention.
Figure 2:
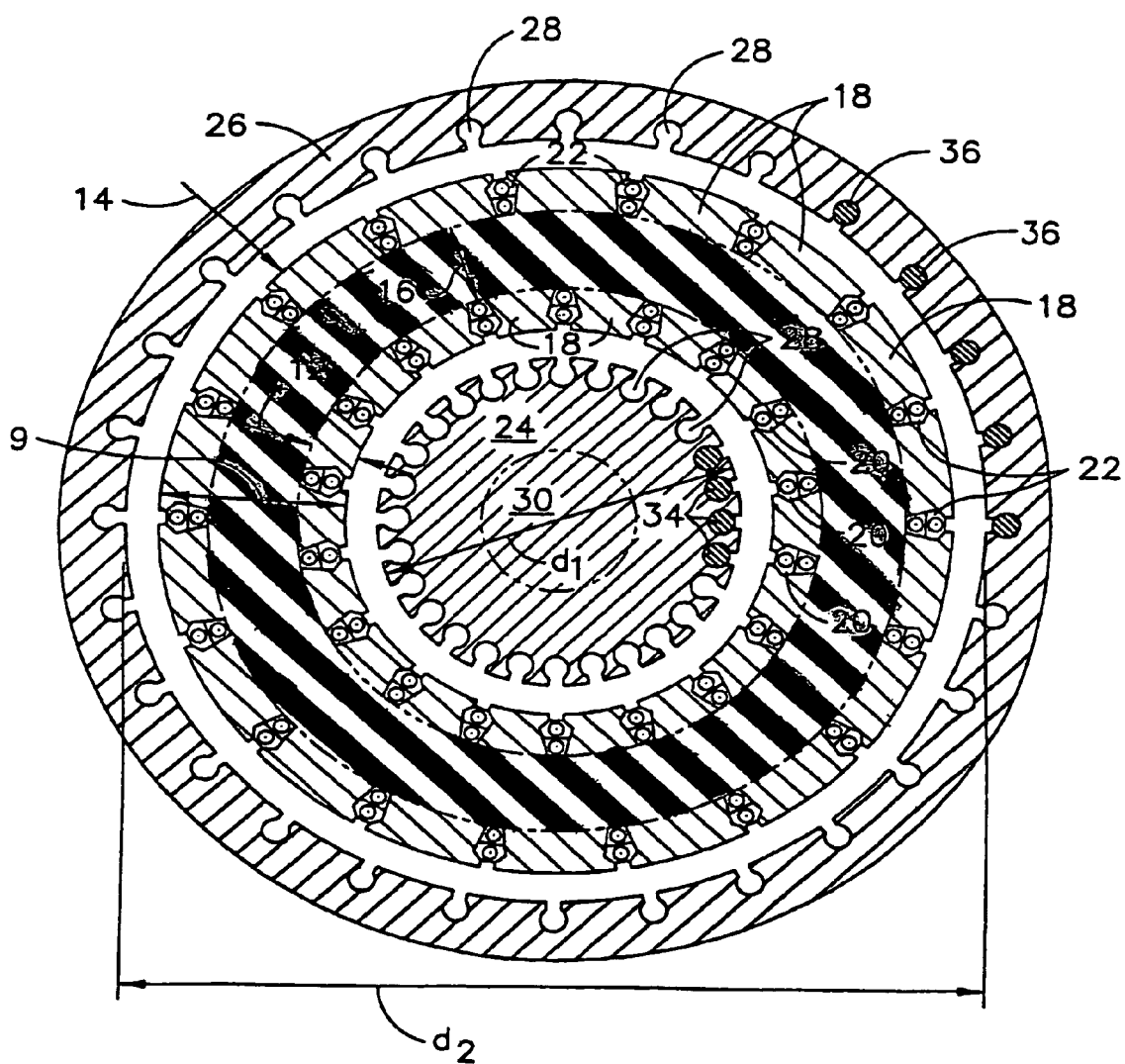
FIG. 2 illustrates, in end view cross section, a single stator core and two concentric rotors for use in a dual concentric AC electric motor.

FIG. 1 illustrates, schematically, in a side view cross section, a dual concentric AC electric motor 10 in accordance with one embodiment of the invention. FIG. 2 illustrates, schematically, in an end view cross section, a single stator core and two rotors for use in such a concentric AC electric motor. Dual concentric AC electric motor 10 may be, for example, an AC induction motor, an AC permanent magnet motor, or the like as the invention is applicable to a wide range of AC electric motors. The dual concentric AC electric motor to be described and illustrated below includes many elements that are common to conventional electric motors. Such elements may include, for example, a motor housing, end bells, cooling elements, shaft bearings, electrical connections, rotor end rings, shorting bars, and the like, as well as the magnetic and non-magnetic materials that make up certain of those elements. Those elements that are common to conventional electrical motors will not be mentioned in detail as they are well know to those familiar with electric motors.

The dual concentric AC electric motor includes a single stator core 9 comprising an inner stator 12 spaced apart from an outer stator 14 by back iron 16 that separates the inner and outer stators both physically and magnetically. Single stator core 9 is a hollow cylindrical shell having a length L1. The back iron or isolator magnetically isolates the two stators and prevents magnetic field overlap between the inner and outer stators. The back iron may be made from, for example, iron or other metallic material with a low magnetic permeability such as a nonmagnetic isolator separating the magnetic flux for the two stators. Both the inner and outer stators have stator teeth 18 spaced equally around the circumference of the respective inner and outer stators. The stator teeth on inner stator 12 face inwards towards the center of the motor while the stator teeth on outer stator 14 face outwards away from the center of the motor. Electrically conductive inner windings 20 surround the inner stator teeth and electrically conductive outer windings 22 surround the outer stator teeth. The windings, which are electrically independent on the inner and outer stators, may be edge wound or the like, and may be made, for example, from copper, aluminum, or other electrically conductive material.

Dual concentric motor 10 also includes two rotors: inner rotor 24 that is coupled to motor output shaft 30 and outer rotor 26 that is coupled to motor output shaft 32. Inner rotor 24 turns inside single stator core 9 and outer rotor 26 turns around the outside of single stator 9. Dual concentric AC motor 10 is designed so that inner stator 12 magnetically couples to inner rotor 24, forming a first AC electric motor, while outer stator 14 magnetically couples to outer rotor 26, forming a second AC electric motor. The two rotors and the associated motor output shafts are thus able to operate independently of one another. Inner rotor 24 has a generally cylindrical outer surface 25 with diameter d1 and outer rotor 26 has a generally cylindrical inner surface 27 with diameter d2. The diameter of a rotor and the diameter of the airspace between that rotor and the respective stator it is coupled to are substantially the same due to the tight tolerances between the rotor and the stator. The torque developed by the first AC electric motor is thus proportional to the current through the windings on inner stator 12 and to the square of the diameter d1. The torque developed by the second AC electric motor is proportional to the current through the windings on outer stator 14 and to the square of the diameter d2. The current through the two stator windings need not be greater than the current that would have been employed with the two separate prior art electric motors. The diameters d1 and d2 may be designed to meet the torque requirements of the motors consistent with the space or volume available in the particular application.

In the illustrated embodiment, both output shafts 30 and 32 exit to the same end (the right side) of the motor. In accordance with further embodiments of the invention, the output shafts can exit on the left side of the motor, or one output shaft may exit on the right side of the motor and the other output shaft may exit on the left side of the motor, depending on the particular applications for which the motors are intended. These output shafts may be coupled to, for example, a transmission, a differential, or the like (neither illustrated).

Both inner and outer rotors have slots 28 spaced equally about the circumference of the rotors and that run the length of the generally cylindrical surfaces of the rotors. The slots on inner rotor 24 face outward away from the center of the motor toward inner stator 12, while the slots on outer rotor 26 face inward toward the center of the motor toward outer stator 14. Inner rotor bars 34 are positioned in each slot in inner rotor 24 and outer rotor bars 36 are positioned in each slot in outer rotor 26, although only a few of the inner and outer rotor bars are illustrated in FIG. 2. Preferably both the inner and outer rotor bars extend a length L2 that is greater than the length L1 of the single stator core. The longer rotor bars reduce magnetic field loss at the stators windings' endturns. The rotor bars may be, for example, copper, aluminum or other metallic material with a high electrical conductivity.

Thus, it is apparent that there has been provided, in accordance with the invention, a dual concentric AC electric motor that meets the needs set forth above. The single stator core and inner and outer rotor arrangement provides optimum axial and radial extension of the active electromagnetic components of the motor within a given dimensional envelope. A conventional side-by-side dual motor arrangement is unable to utilize space as efficiently as a dual concentric AC electric motor in accordance with the invention, and thus the inventive motor has a greater torque per amp for a given volume. The dual concentric AC motor also minimizes motor losses such as those at the winding endturns. Although the invention has been described and illustrated with reference to specific embodiments thereof, it is not intended that the invention be limited to such illustrative embodiments. For example, the composition of the motor components and other common motor variations may be utilized depending on the particular application for which the motor is designed. Those of skill in the art will recognize that many variations and modifications of such embodiments are possible without departing from the spirit of the invention. Accordingly, it is intended to be included within the invention all such variations and modifications as fall within the scope of the appended claims.

The invention claimed is:

1. A dual concentric electric motor comprising:
   a hollow stator core having an axis;
   a first rotor concentric with and positioned inside the hollow stator core and electrically driven by said hollow stator core;
   a second rotor concentric with and positioned outside the hollow stator core and electrically driven by said hollow stator core;
   a first motor shaft coupled to said first rotor;
   a second motor shaft coupled to said second rotor; and
   wherein the hollow stator core comprises:
      a hollow cylindrical inner stator;
      a hollow cylindrical outer stator; and
      a nonmagnetic isolator positioned between and separating the inner stator and the outer stator.

2. The dual concentric electric motor of claim 1 wherein:
   the hollow cylindrical inner stator comprises a plurality of inner stator teeth facing the axis; and
   the hollow cylindrical outer stator comprises a plurality of outer stator teeth facing away from the axis.

3. The dual concentric electric motor of claim 1 wherein the first motor shaft and the second motor shaft both exit a same end of the motor.

4. The dual concentric electric motor of claim 1 further comprising:
   a plurality of first slots formed on an outer surface of the first rotor; and
   a plurality of second slots formed on an inner surface of the second rotor.

5. The dual concentric electric motor of claim 4 further comprising:
   a plurality of first electrically conductive rotor bars positioned in the first slots; and
   a plurality of second eclectically conductive rotor bars positioned in the second slots.

6. A dual concentric AC electric motor comprising:

a hollow cylindrical stator core having a central axis, the stator core comprising an inner stator and an outer stator spaced apart by an isolator separating the magnetic flux generated by the inner and outer stator;

a first plurality of stator teeth formed on an inner surface of the inner stator and facing the central axis;

a second plurality of stator teeth fanned on an outer surface of the outer stator and facing outwardly from the ventral axis;

an inner rotor concentric with and positioned inside the inner stator and driven by said inner stator;

an outer rotor concentric with and positioned outside the outer stator and driven by said outer stator;

a plurality of first slots formed in an outer surface of the inner rotor and positioned to face the inner stator, an electrically conductive first rotor bar positioned in each of the plurality of first slots;

a plurality of second slots formed in an inner surface of the outer rotor and positioned to face the outer stator, an electrically conductive second rotor bar positioned in each of the plurality of second slots;

a first motor output shaft coupled to the inner rotor; and a second motor output shaft coupled to the outer rotor.

* * * * *